United States Patent
Hewitt et al.

(10) Patent No.: US 9,249,837 B2
(45) Date of Patent: Feb. 2, 2016

(54) WINGED ELASTOMERIC COUPLING WITH MINIMIZED SEPARATION FORCES BETWEEN ELASTOMER AND CLAMP RING

(71) Applicant: Baldor Electric Company, Fort Smith, AR (US)

(72) Inventors: William Gregory Hewitt, Taylors, SC (US); Alexander Brian Vitou, Greenville, SC (US)

(73) Assignee: Baldor Electric Company, Fort Smith, AR (US)

( * ) Notice: Subject to any disclaimer, the term of this patent is extended or adjusted under 35 U.S.C. 154(b) by 34 days.

(21) Appl. No.: 14/135,813

(22) Filed: Dec. 20, 2013

(65) Prior Publication Data

US 2015/0176656 A1 Jun. 25, 2015

(51) Int. Cl.
*F16D 3/74* (2006.01)
*F16D 1/116* (2006.01)

(52) U.S. Cl.
CPC *F16D 3/74* (2013.01); *F16D 1/116* (2013.01); *F16D 2003/745* (2013.01)

(58) Field of Classification Search
CPC .............................. F16D 3/74; F16D 2003/745
USPC ................................................. 464/49, 80, 88
See application file for complete search history.

(56) References Cited

U.S. PATENT DOCUMENTS

| | | | |
|---|---|---|---|
| 3,095,714 A * | 7/1963 | Schlotmann | 464/80 |
| 3,524,332 A * | 8/1970 | Callies | 464/80 |
| 4,634,400 A | 1/1987 | Butzow et al. | |
| 5,611,732 A | 3/1997 | Tirumalai | |
| 6,080,065 A | 6/2000 | Hindman et al. | |
| 6,117,015 A | 9/2000 | Ryan et al. | |
| 6,196,926 B1 | 3/2001 | Goebel et al. | |
| 6,257,985 B1 | 7/2001 | Ward et al. | |
| 7,390,265 B2 * | 6/2008 | Smihal | 464/80 |
| 2006/0009297 A1 | 1/2006 | Hubiak et al. | |
| 2014/0162795 A1 | 6/2014 | Hewitt et al. | |

* cited by examiner

*Primary Examiner* — Gregory Binda
(74) *Attorney, Agent, or Firm* — Thompson Coburn LLP

(57) ABSTRACT

A coupling transmits torque between two shafts approximately aligned on a shaft axis. The coupling has a center axis approximately aligned with the shaft axis. The coupling comprises arcuate coupling segments with ends extending generally parallel to the coupling center axis and arcuate portions extending between the ends. The arcuate coupling segments are arranged in a ring with adjacent segments being arranged end to end to form the coupling. Each coupling portion comprises a first clamp ring adapted to be operatively attached to a shaft and a second clamp ring adapted to be operatively connected to another shaft. Elastomer material extends between both clamp rings. The elastomer material extends axially and circumferentially on each clamp ring in areas adjacent to each end of the arcuate coupling segment.

23 Claims, 5 Drawing Sheets

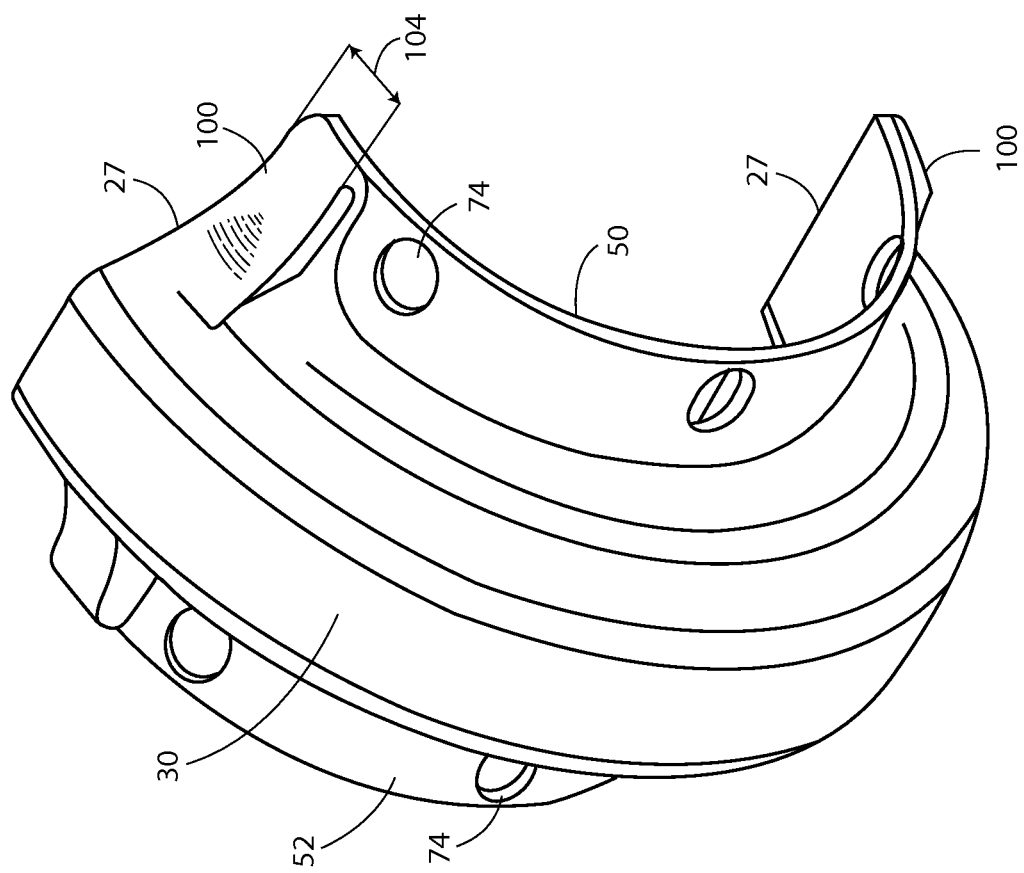
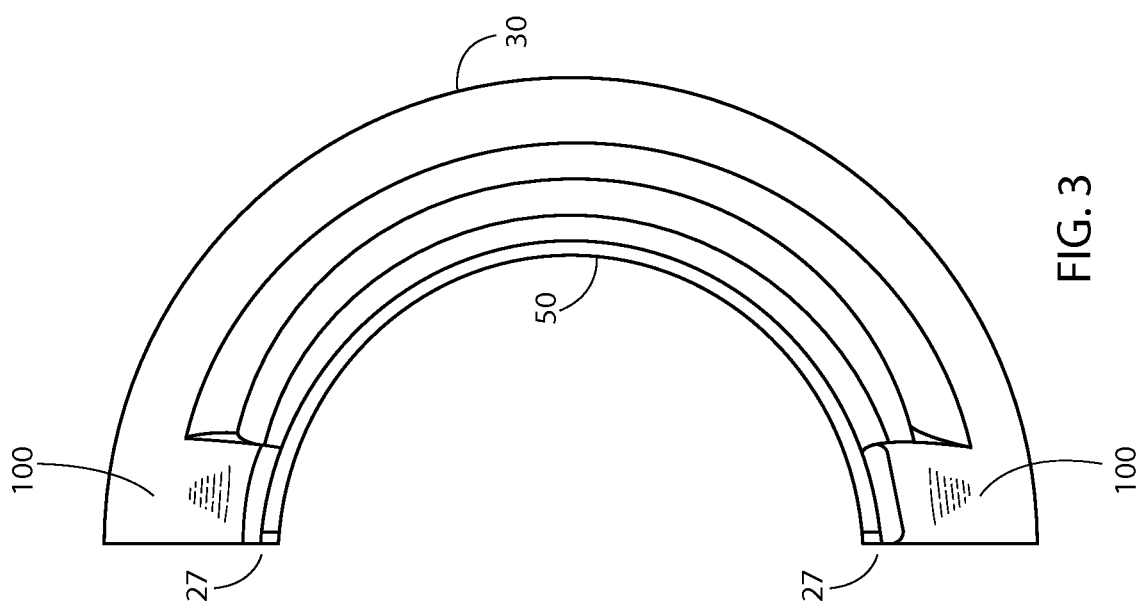

WINGED ELASTOMERIC COUPLING WITH MINIMIZED SEPARATION FORCES BETWEEN ELASTOMER AND CLAMP RING

BACKGROUND AND SUMMARY

This disclosure relates generally to elastomeric couplings for transmitting torque between two shafts approximately aligned on a shaft axis, i.e., elastomeric couplings joining a pair of axially spaced shafts. The coupling has clamp rings with flange portions that are encapsulated in or embedded in and fixed in the material comprising the elastomeric element. The elastomeric element has winged portions that minimized separation forces between the elastomeric element and the clamp rings.

BRIEF DESCRIPTION OF THE DRAWINGS

FIG. 2 illustrates a perspective view of a semi-annular coupling portion of FIG. 1;

FIG. 3 illustrates a front view of the semi-annular coupling portion of FIG. 2;

DETAILED DESCRIPTION

Figure 1:
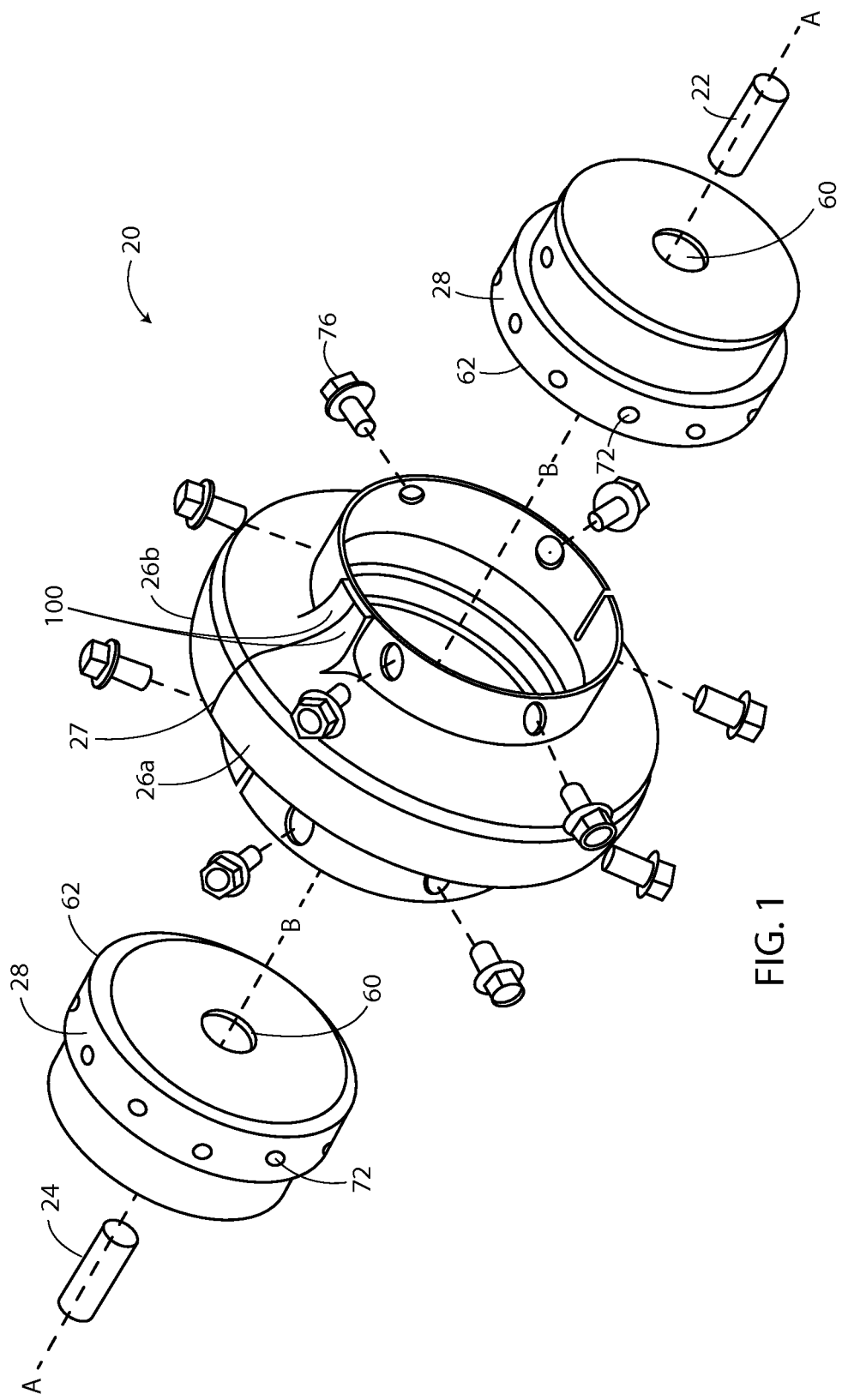
FIG. 1 illustrates a perspective exploded view of shaft hubs and a coupling.

Referring to FIG. 1, an elastomeric coupling 20 for transmitting torque between two shafts 22,24 approximately aligned on a shaft axis A-A is shown. The coupling may comprise arcuate coupling segments 26a,26b. For instance, as shown in the drawings, the coupling comprises two semi-annular portions or coupling halves arranged with ends 27 abutting form a ring of the coupling. While the drawings show arcuate coupling segments comprising halves or semi-annular coupling portions, other configurations may be used. For instance, the arcuate coupling segments may comprise quarters or thirds, or combinations thereof, such as, for example, two quarter arcuate segments and a one half arcuate segment. Each coupling portion may be arranged about shaft hubs 28 to form the coupling 20 with a center axis B-B generally coinciding with the shaft axis A-A.

Figure 4:
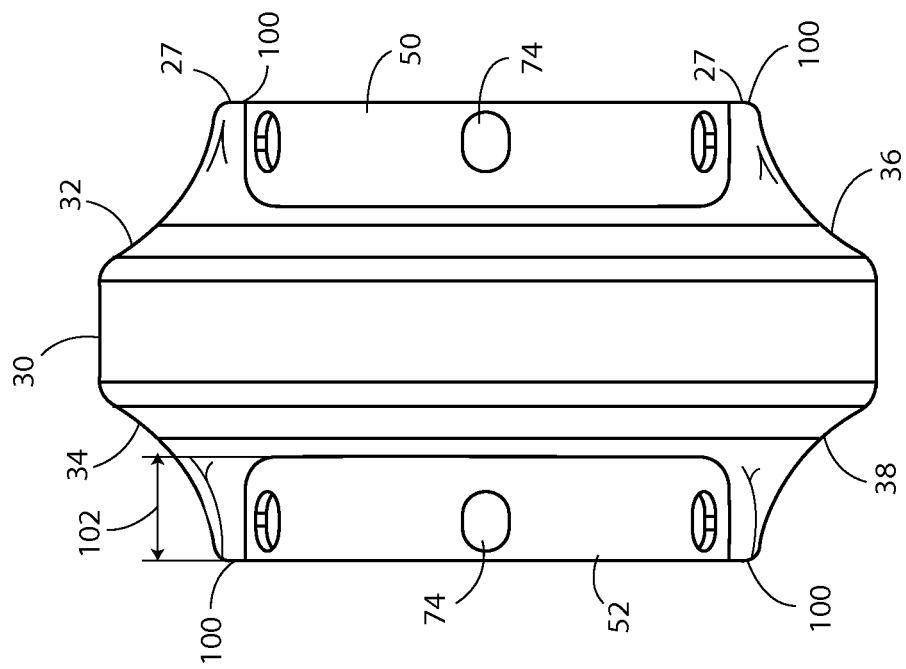
FIG. 4 illustrates a side view of the semi-annular coupling portion of FIG. 2.
Figure 5:
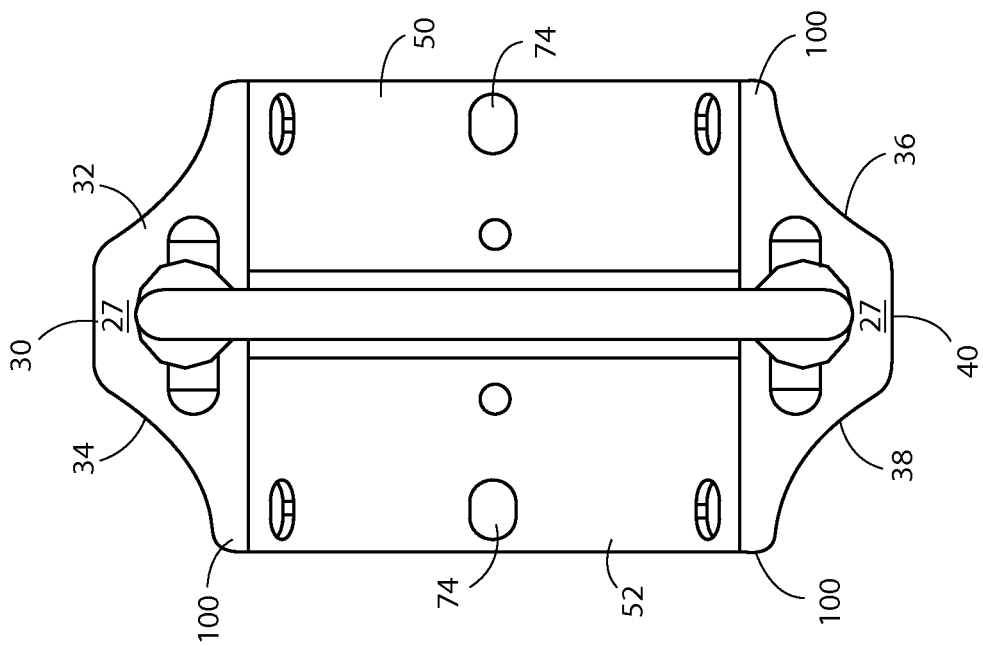
FIG. 5 illustrates an alternate side view of the semi-annular coupling portion of FIG. 2, opposite the view of FIG. 4.

As best shown in FIGS. 4 and 5, each semi-annular coupling portion 26a,26b comprises a center element 30 with first and second axially opposite sides 32,34. The center element 30 may have a first leg portion 36 forming the first axial side 32 and a second leg portion 38 forming the second axial side 34 with a bridging portion 40 extending between each leg portion 36,38 to form the coupling center element. Thus, the first and second portions legs of the center element are integrally connected by the bridging portion which is located in a radially spaced relation to the coupling center axis. The center element may be formed of any suitable elastomeric material, such as rubber, urethane, or their derivatives.

Each coupling portion has a clamp ring 50,52 extending from its side. When the coupling comprises a semi-annular portion, the clamp ring may also comprise semi-annular bodies. The clamp ring may be made from any rigid material such as steel, plastic, etc. When the center element is formed with first and second leg portions as shown in FIGS. 4 and 5, each clamp ring may extend axially from its respective leg portion along the coupling center axis. Each clamp ring 50,52 may have a flange portion (not shown) that may be embedded within center element. When the center element is formed with first and second leg portions, each clamp ring flange portion may be embedded in the respective leg portion of the center element. The flange portion may be machined in the clamp ring or otherwise formed as an integral part of the clamp ring, through a swaging or punching operation. The flange portion may also be bonded, welded, or otherwise affixed to or deposited on the clamp ring. Each clamp ring also has an attachment portion that extends outward from the center element to allow the coupling to be attached to a shaft hub.

As best shown in FIG. 1, the first and second hubs 28 are generally identically constructed, are generally annular, and can be fabricated of any suitable generally rigid material, such as a metal. The first and second hubs 28 respectively include inner axial bores or surfaces 60 adapted to be respectively connected to, or engaged with, the first and second shafts 22,24. In addition, the first and second hubs respectively include outer cylindrical surfaces 62 which are respectively engaged by clamp rings of the coupling.

The coupling clamp ring attachment portions are adapted to connect with first and second hubs 28 of the shafts 22,24. The clamp rings 50,52 may surround the shaft hubs 28. For instance, each coupling portion may have a semi-annular shape and the respective clamp ring may be generally semi-annular with a semi-cylindrical shape. The outer cylindrical surfaces 62 of the hubs may engage with inner surfaces 70 of the clamp ring attachment portions and may be engaged substantially throughout the outer surfaces of the hubs. By way of illustration, in a zero-clearance type of application where the shaft hubs cannot be moved along the shaft axis, a first semi-annular coupling portion may be mounted to a semi-annular portion of the shaft hubs and a second semi-annular coupling portion may be mounted to the remaining semi-annular portion of the shaft hubs. Although not shown in the drawings, the clamp rings may engage side faces of the hubs.

To allow installation, the first and second hubs 28 also respectively include a plurality of holes 72 circumferentially spaced about their outer surfaces, and the clamp ring attachment portions may have a plurality of holes 74 circumferentially spaced about the clamp rings. The hub fastener holes 72 correspond with the clamp ring holes 74, thereby allowing the clamp ring holes to be brought into register with the hub holes. The clamp rings may be secured to the shaft hubs by passing mechanical fasteners 76 through the clamp ring holes 74 and threading them into the shaft hub holes 72. The holes 74 on the clamp rings may be elongated or formed as slots to allow for the clamp rings to be connected to the shaft hubs when there is misalignment therebetween. By providing elongated holes or slots when misalignment exists, the installer has the ability to align the fasteners through the clamp rings with the threaded holes in the hubs. Slots instead of clearance holes allow the fasteners to pass through the clamp rings slots and into the threaded holes of the hubs when there may be parallel and/or angular misalignment between the hubs. Although not shown in the drawings, pins or other fastener means may also be used to secure the clamp rings to the shaft hubs.

Each coupling portion (or in the case of a single integrated coupling) is preferably made by a resin transfer molding process. Resin may be injected into the mold to impregnate a glass fiber material to form the center element. The resin impregnated material may then be cured. The clamp rings may be fixed to the center element during the application of the resin material to the mold, upon curing, or upon subsequent to removal of the center element from the mold.

At the ends 27 of the semi annular coupling portions 26a, 26b, forces tending to separate the elastomer from the clamp ring are at their highest. These forces tend to cause separation or failure of the bond between the elastomer center element and the clamp ring. This separation or failure is often exacerbated when the coupling is cycled back and forth or continuously flexed. To increase the bond area at the ends 27, winged portions 100 of elastomer are provided. Each winged portion 100 comprises elastomer material extending axially from side faces 32,34 of the center element 30 along the clamp ring attachment portion. The winged portions 100 may taper toward the clamp ring attachment portion. The winged portions may extend to the periphery or distal end of the respective clamp ring 50,52. The amount of axial extension 102 (FIG. 4) may be selected as desired to provide sufficient area to increase bonding of the elastomer to the clamp ring. The winged portions 100 may extend circumferentially from the end 27 around the clamp ring. The amount of circumferential extension 104 (FIG. 2) may be selected as desired to provide sufficient area to increase bonding of the elastomer to the clamp ring. The circumferential and axial extensions 102, 104 of the winged portions 100 may be selected as desired to form a bond area sufficient to withstand the effects of the disbonding forces at the end 27. Placing a winged portion 100 of elastomer at the end 27 of the coupling portion has minimal impact on the overall torsional stiffness of the coupling. The number of winged portions 100 may be selected as necessary to create a desired amount of bonding area between the elastomer and the clamp ring.

Figure 6:
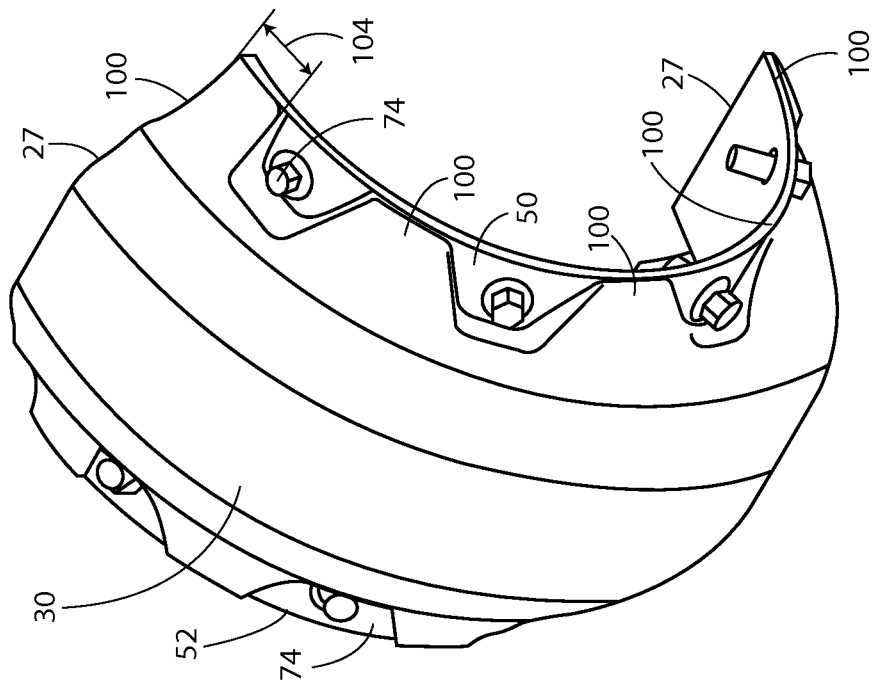
FIG. 6 illustrates a perspective view an alternate embodiment of a semi-annular coupling portion.
Figure 7:
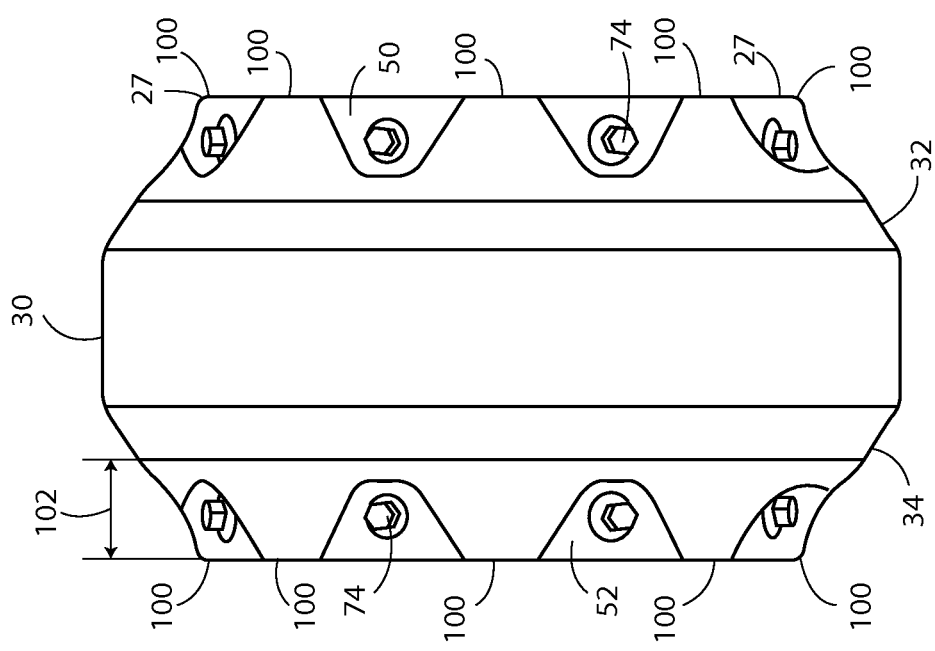
FIG. 7 illustrates a side view of the semi-annular coupling portion of FIG. 6.
Figure 8:
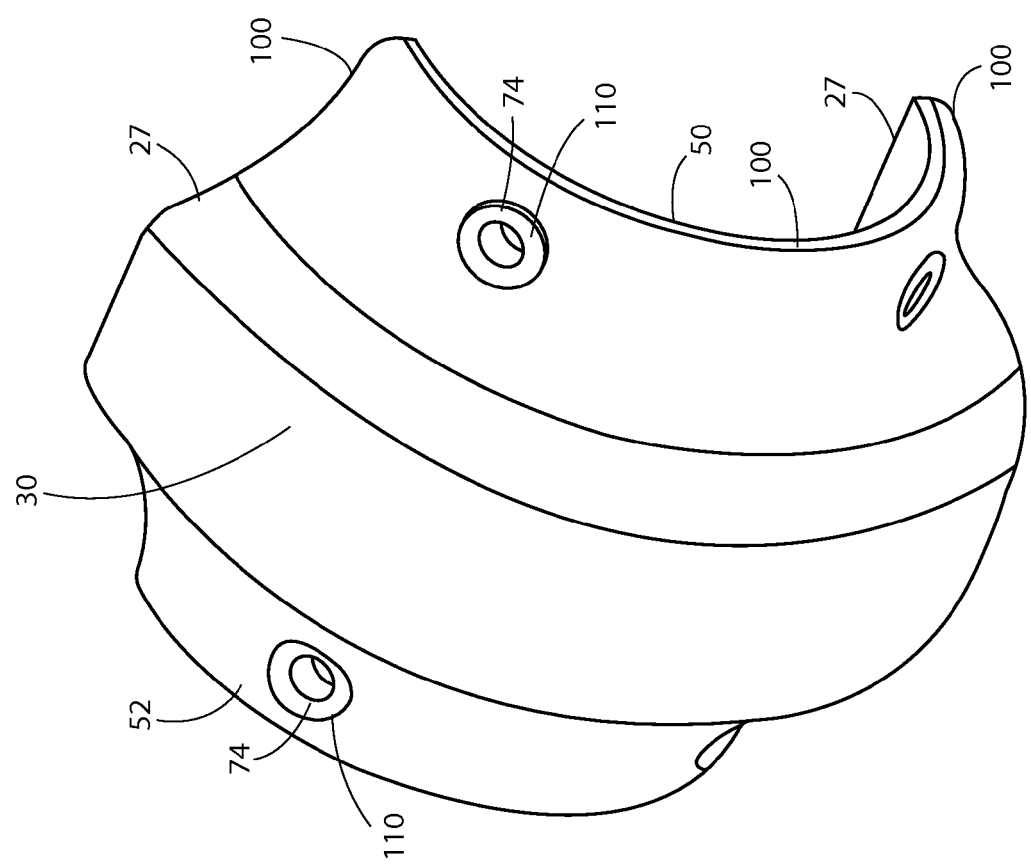
FIG. 8 illustrates a perspective view an alternate embodiment of a semi-annular coupling portion.

To provide further increases in the bond area, the wing portions may be arranged in other areas of the clamp ring. For instance, as shown in FIGS. 6 and 7, the winged portions are provided at the ends 27 of the clamp rings 50,52, and also in areas intermediate of the ends, leaving clearance around the clamp ring holes 74. FIG. 8 shows another example where grommets 110 may be provided in the clamp ring holes 74, and the winged portions extend around the grommets 110. In FIG. 8, the elastomer in effect extends continuously in the axial and circumferential directions such that elastomer is bonded along the entire outer surface of the clamp ring. In FIG. 8, the grommets 110 provide access for bolt passage and securing the arcuate coupling segments to the shaft hubs. In this way, the clamp ring need not be modified and enhanced bonding may be provided by configuring the elastomer as desired during the mold process.

The embodiments were chosen and described in order to best explain the principles of the disclosure and their practical application to thereby enable others skilled in the art to best utilize said principles in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A coupling for transmitting torque between two shafts approximately aligned on a shaft axis, the coupling having a center axis approximately aligned with the shaft axis, the coupling comprising:
   arcuate coupling segments with ends extending generally parallel to the coupling center axis and arcuate portions extending between the ends, the arcuate coupling segments being arranged in a ring with adjacent segments being arranged end to end to form the coupling, each coupling portion comprising a first clamp ring adapted to be operatively attached to a shaft and a second clamp ring adapted to be operatively connected to another shaft; and
   elastomer material extending between both clamp rings and defining generally axially opposite ends of the coupling segment on the clamp rings, the elastomer material extending axially and circumferentially from the axially opposite ends on each clamp ring in areas adjacent to each end of the arcuate coupling segment.

2. The coupling of claim 1, wherein the coupling comprises semi-annular arcuate coupling segments.

3. The coupling of claim 1, wherein the clamp ring has holes.

4. The coupling of claim 3, wherein the elastomer extends substantially over the clamp ring of each arcuate coupling segment except for areas around the holes.

5. The coupling of claim 3, wherein the holes have grommets.

6. The coupling of claim 5, wherein the elastomer extends substantially over the clamp ring of each arcuate coupling segment and around the grommets.

7. The coupling of claim 1, further comprising elastomer material extending axially and circumferentially along the clamp ring in an area intermediate of the ends of the arcuate coupling segment.

8. The coupling of claim 1, wherein the elastomer material extends radially relative from the axially opposite ends of the center element at each end of the arcuate coupling segment.

9. A coupling for transmitting torque between two shafts approximately aligned on a shaft axis, the coupling having a center axis approximately aligned with the shaft axis, the coupling comprising:
   arcuate coupling segments with ends extending generally parallel to the coupling center axis and arcuate portions extending between the ends, the arcuate coupling segments being arranged in a ring with adjacent segments being arranged end to end to form the coupling, each coupling portion comprising:
   a center element formed from an elastomer material having axially opposite sides; and
   a first clamp ring extending from one axial side of the center element and a second clamp ring extending from the axial opposite side of the center element, each clamp ring including an attachment portion adapted to be operatively attached to a shaft, the attachment portion extending axially from each of the axially opposite sides of the center element;
   wherein the elastomer material extends axially and circumferentially from the center element axially opposite sides adjacent to each end of the arcuate coupling segment.

10. The coupling of claim 9, wherein the center element has first and second leg portions axially spaced from each other along the coupling center axis between the axially opposite sides with a bridging portion extending between the leg portions.

11. The coupling of claim 9, further comprising elastomer material extending axially and circumferentially from the center element first and second axial sides in an area intermediate end of the arcuate coupling segment.

12. The coupling of claim 9, wherein the elastomer extends substantially over the clamp ring attachment portion of each arcuate coupling segment.

13. The coupling of claim 9, wherein the clamp ring attachment portion has holes.

14. The coupling of claim 13, wherein the elastomer extends substantially over the clamp ring attachment portion of each arcuate coupling segment except for areas around the holes.

15. The coupling of claim 9, wherein the elastomer material is radially tapered away from the first and second axial sides of the center element adjacent to each end of the arcuate coupling segment.

16. A coupling for transmitting torque between two shafts approximately aligned on a shaft axis, the coupling having a center axis approximately aligned with the shaft axis, the coupling comprising:

arcuate coupling segments with ends extending generally parallel to the coupling center axis and arcuate portions extending between the ends, the arcuate coupling segments being arranged in a ring with adjacent segments being arranged end to end to form the coupling, each coupling portion comprising:

a center element formed from an elastomer material wherein the center element has first and second axial sides; and a clamp ring including an attachment portion adapted to be operatively attached to a shaft, the attachment portion extending axially from each of the first and second sides of the center element;

wherein the elastomer material extends axially and circumferentially from the center element first and second axial sides adjacent to each end of the arcuate coupling segment.

17. The coupling of claim 16, wherein the clamp ring attachment portion has holes.

18. The coupling of claim 17, wherein the elastomer extends substantially over the clamp ring attachment portion of each arcuate coupling segment except for areas around the holes.

19. The coupling of claim 17, wherein the holes have grommets.

20. The coupling of claim 19, wherein the elastomer extends substantially over the clamp ring attachment portion of each arcuate coupling segment and around the grommets.

21. The coupling of claim 16, wherein the clamp ring attachment portion of each arcuate segment is adapted to fit around an outer diameter surface of a shaft hub when mounting the coupling to a shaft.

22. The coupling of claim 16, wherein each arcuate coupling segment is generally semi-circular in shape.

23. The coupling of claim 16, wherein the elastomer material is radially tapered away from the center element first and second axial sides adjacent to each end of the arcuate coupling segment.

* * * * *